United States Patent
Kaufmann et al.

(10) Patent No.: US 10,022,802 B2
(45) Date of Patent: Jul. 17, 2018

(54) CUTTING INSERT

(71) Applicant: Kennametal Inc., Latrobe, PA (US)

(72) Inventors: Igor Kaufmann, Nürnberg (DE); Franz Havrda, Großenseebach (DE)

(73) Assignee: KENNAMETAL INC., Latrobe, PA (US)

( * ) Notice: Subject to any disclaimer, the term of this patent is extended or adjusted under 35 U.S.C. 154(b) by 222 days.

(21) Appl. No.: 14/940,948

(22) Filed: Nov. 13, 2015

(65) Prior Publication Data

US 2016/0136734 A1 May 19, 2016

(30) Foreign Application Priority Data

Nov. 14, 2014 (DE) ........................ 10 2014 116 660

(51) Int. Cl.
*B23B 27/22* (2006.01)
*B23B 27/04* (2006.01)

(52) U.S. Cl.
CPC .... *B23B 27/045* (2013.01); *B23B 2200/0423* (2013.01); *B23B 2200/081* (2013.01); *B23B 2200/087* (2013.01); *B23B 2200/202* (2013.01); *Y10T 407/235* (2015.01); *Y10T 407/24* (2015.01); *Y10T 407/25* (2015.01)

(58) Field of Classification Search
CPC .............. Y10T 407/235; Y10T 407/24; Y10T 407/245; Y10T 407/25; B23B 27/10; B23B 27/045; B23B 27/04; B23B 27/22; B23B 2200/086; B23B 2200/0423; B23B 2200/081; B23B 2200/087; B23B 2200/202

See application file for complete search history.

(56) References Cited

U.S. PATENT DOCUMENTS

| 5,725,334 | A | * | 3/1998 | Paya ..................... | B23B 27/045 407/104 |
| 6,261,032 | B1 | * | 7/2001 | Duwe .................. | B23B 27/045 407/107 |
| 6,796,752 | B2 | * | 9/2004 | Tong ..................... | B23B 27/045 407/114 |
| 7,275,896 | B2 | * | 10/2007 | Nudelman ............ | B23B 27/045 407/113 |
| 2003/0170081 | A1 | * | 9/2003 | Andersson ............ | B23B 27/045 407/116 |
| 2006/0269367 | A1 | * | 11/2006 | Havrda .................. | B23B 27/045 407/117 |
| 2008/0240874 | A1 | * | 10/2008 | Nagaya ................. | B23B 27/045 407/113 |

(Continued)

*Primary Examiner* — Nicole N Ramos
(74) *Attorney, Agent, or Firm* — Matthew S. Bedsole

(57) ABSTRACT

The invention relates to an interchangeable cutting insert (10) having a shank (12), which transitions into a cutting head (14), which has a chipping surface (32), which, when viewed from above, is a segment of a circle with a height greater than the radius of the chipping surface (32), wherein the chord of the segment of a circle constitutes the transition to the shank (12), wherein a cutting edge (30) is formed on the outer edge of the chipping surface and multiple chip-breaking structures (36, 38) are provided on the chipping surface (32), the chip-breaking structures having depressions (36) in the chipping surface (32), between which projections (38) are arranged, which protrude beyond the chipping surface (32).

15 Claims, 4 Drawing Sheets

(56) References Cited

U.S. PATENT DOCUMENTS

| | | | | |
|---|---|---|---|---|
| 2008/0240875 A1* | 10/2008 | Nagaya | ............... | B23B 27/045 407/113 |
| 2013/0213196 A1* | 8/2013 | Sakai | ................. | B23B 27/045 82/1.11 |
| 2014/0147219 A1* | 5/2014 | Kaufmann | ........... | B23B 27/045 407/11 |
| 2015/0343534 A1* | 12/2015 | Kaufmann | ........... | B23B 27/045 407/11 |

* cited by examiner

CUTTING INSERT

RELATED APPLICATION DATA

The present application claims priority pursuant to 35 U.S.C. § 119(a) to German Patent Application Number 102014116660.4 filed Nov. 14, 2014 which is incorporated herein by reference in its entirety.

FIELD

The invention relates to an interchangeable cutting insert with a shank which transitions into a cutting head having a chipping surface, which, when viewed from above, is a segment of a circle having a height greater than the radius of the chipping surface, wherein the chord of the segment of a circle constitutes the transition to the shank, wherein a cutting edge is formed on the outer edge of the chipping surface and multiple chip-breaking structures are provided on the chipping surface.

BACKGROUND

A cutting insert of this type can be used in particular for making grooves in a workpiece during turning. In this process, the chip-breaking structures provided on the chipping surface would then serve to suitably break the chips moving over the chipping surface during turning so that the chipping process is not disrupted by the chips.

SUMMARY

The invention seeks to produce a cutting insert having good chip-breaking properties even at different angles of attack and different cutting depths.

To solve this problem, the invention provides that in the case of a cutting insert of the type initially specified, the chip-breaking structures have depressions in the chipping surface, between which are arranged projections which protrude beyond the chipping surface. It has been found that with alternating chip-breaking structures which run lower than the chipping surface and then higher than the chipping surface, the chips moving along the chipping surface can be especially well broken.

It is preferably provided that the cutting edge has a chamfer which transitions into the chipping surface and that the depressions terminate radially outside on the transition between the chamfer and the chipping surface. The depressions are thus arranged at a certain distance from the cutting edge and weaken neither the cutting edge nor the chamfer.

The depressions have lateral rims oriented radially. This promotes good chip flow.

The depressions can gently taper off radially outward to the cutting edge. This allows the chips to enter the depression without any problem.

According to an embodiment of the invention, five depressions can be provided. This number has been found to be a good compromise. For other tool sizes, however, another number of depressions can also be used.

The projections are preferably realized as ribs which generally extend radially. Owing to this direction of extension, the chips can flow out well and be guided via the chipping surface.

It is preferably provided that the ribs have a radially outer segment, which is oriented radially, and a radially inner segment, which is curved away toward the shank in relation to a radial orientation. This leads to good chip-breaking and guiding properties.

Preferably, four ribs are provided, two of which lying near a center plane defined by the shank being designed as shorter than two ribs spaced further from the center plane. This enables the ribs to be distributed on the cutting surface such that optimal chip-breaking and guiding properties are achieved.

According to an embodiment of the invention, provided between the two center ribs is a level at which the chipping surface drops. This also leads to good chip-breaking properties.

According to an embodiment of the invention, provided between a middle and outside-lying rib is a ridge, the height of which ranges between 10 to 30% of the height of the projections. The ridge supports the chip-breaking function in the case of chips that flow diagonally in relation to the center plane via the chipping surface.

It is preferably provided that the cutting edge has a chamfer which transitions into the chipping surface and that the projections terminate at a distance from the chamfer. The distance ensures that the projections do not compromise the chipping process at the cutting edge.

It can be provided that this distance ranges between 10 and 50% of the radial extension of the depressions. This value ensures that the projections originate sufficiently close to the chamfer so that the chips can be reliably broken.

According to an embodiment of the invention, the width of the depressions on the radially outer lying side thereof measures in the neighborhood of 20% of the radius of the chipping surface. This ensures that the chips can also penetrate into the depressions and can be reliably broken upon exiting.

It can also be provided that the width of the projections measures in the neighborhood of 20% of the radius of the chipping surface. This results in the projections being of sufficient strength. The width of the depressions in this case results from the spacing between the ribs, so that the outer edge of the depression does not directly border the outer edge of the rib radius.

BRIEF DESCRIPTION OF THE DRAWINGS

The invention will be explained below with reference to an embodiment that is portrayed in the accompanying drawings. In the drawings.

DETAILED DESCRIPTION

Figure 1:
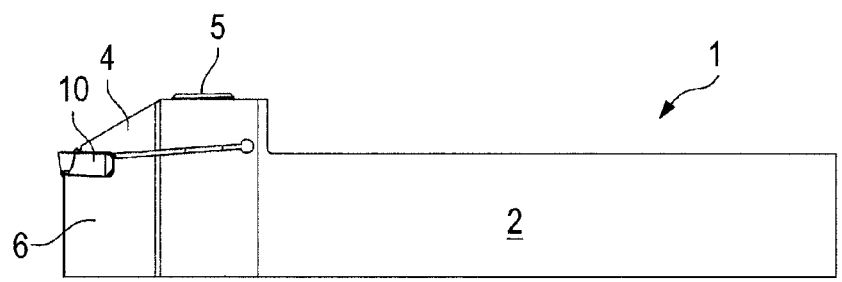
FIG. 1 shows a tool holder with cutting insert placed thereon in side view.
Figure 2:
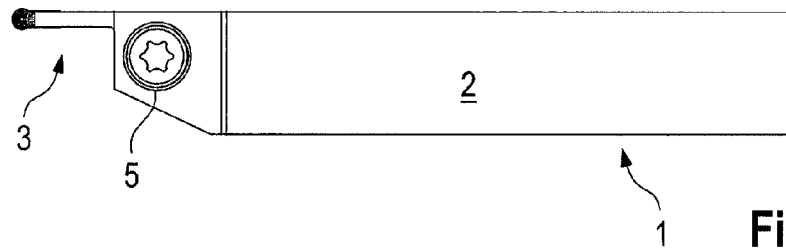
FIG. 2 shows a top view of the tool holder from FIG. 1.
Figure 3:
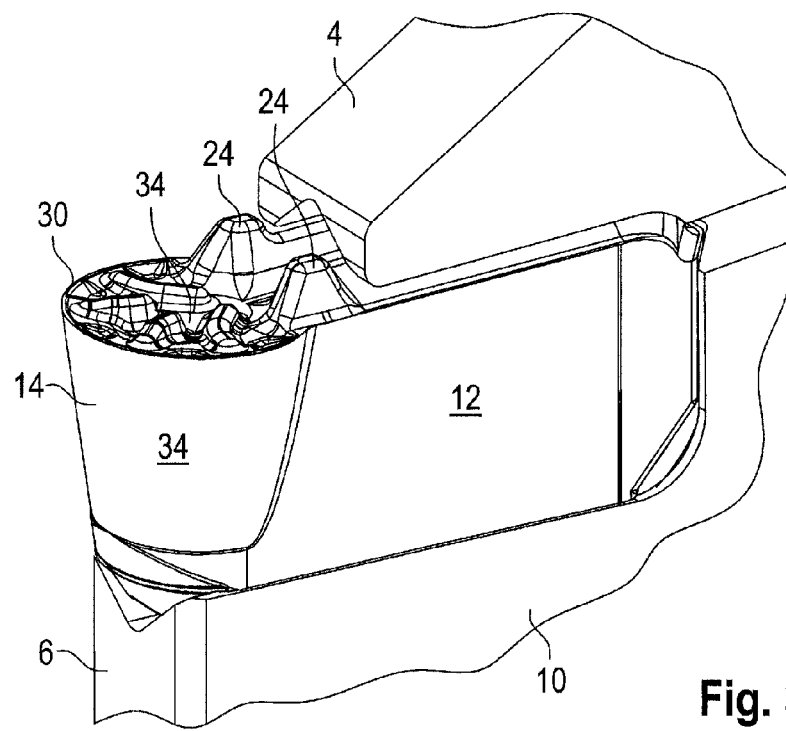
FIG. 3 shows a perspective view of the front segment of the tool holder from FIGS. 1 and 2.

FIGS. 1 through 3 show a tool holder 1 having a fastening segment 2 with which the tool holder can be mounted on a machine tool.

At its front end, the tool holder 1 has a clamping segment 3, which has a clamping arm 4, which can be pressed against a counter bearing 6 by means of a clamping screw 5. A cutting insert 10 can be clamped between clamping arm 4 and counter bearing 6.

Figure 4:
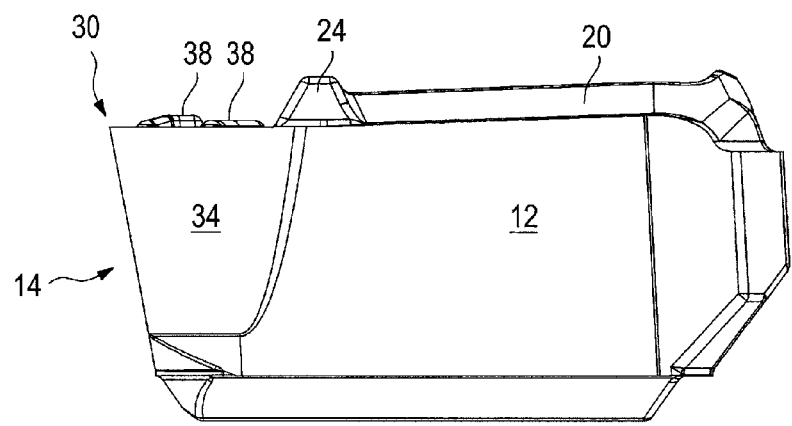
FIG. 4 shows a side view of the cutting insert according to the invention.
Figure 7:
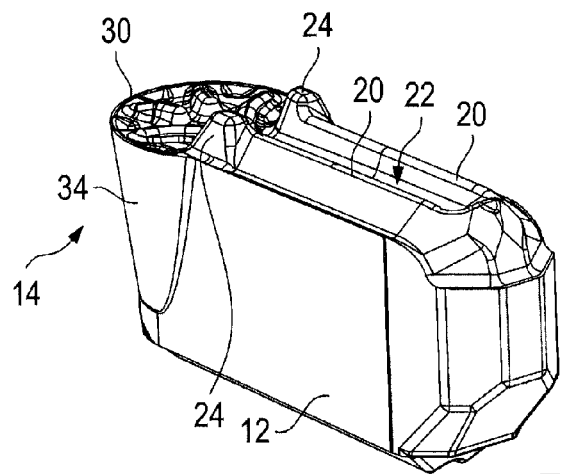
FIG. 7 shows a perspective view of the cutting insert from FIG. 4.

The cutting insert 10 is used particularly for grooving and for cut-out turning. It has a shank 12 (see in particular FIGS. 4, 5 and 7) as well as a cutting head 14, which is realized as a single piece with the shank 12.

When viewed from above (see in particular FIG. 5), the cutting edge 14 has the shape of a segment of a circle, the height of which is greater than the radius of the circle. In other words, the circular outer contour of the cutting edge extends over an angle greater than 180°.

In the embodiment shown, the outer contour extends over an angle in the neighborhood of 240°, this angle being a function of the ratio of the diameter of the cutting head 14 to the width of the shank 12. In any case, the diameter of the cutting head 14, when viewed from above, is greater than the width of the shank 12. The virtual chord S, which constitutes the transition from the cutting head 14 to the shank 12, is indicated as a dashed line in FIG. 5.

Figure 6:
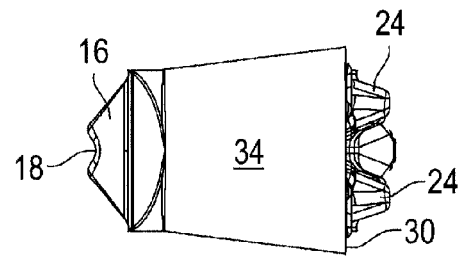
FIG. 6 shows a frontal view of the cutting insert from FIG. 4.

The shank 12 serves to keep the cutting head 10 firmly clamped in the tool holder 1. For this purpose, the shank has, on its bottom side, a structure 16 of roughly V-shaped cross section having a centered groove 18 (see FIG. 6) and, on its top side, two clamping structures 20 extending in the longitudinal direction of the shaft 12, between which a channel 22 is formed. Each of the two clamping structures 20 is provided with a knob 24 on its respective end pointing toward the cutting head 14.

The outer contour (visible from above) of the cutting head 14, which has a constant radius, forms a cutting edge 30. The cutting edge 30 constitutes the transition between the surface on the top side of the cutting head 14, referred to as the chipping surface (labeled here with the reference number 32) and the shell surface of the cutting head, referred to as the free surface (labeled here with the reference number 34).

Provided here between the cutting edge 30 and the chipping surface 32 is a circumferential chamfer 33, which is designed as what is referred to as a T-chamfer.

The free surface 34 has the basic shape of a truncated cone, the larger base lying on the chipping surface 32 side.

The cutting edge 30 has consistently the same radius along its entire course.

The chipping surface 32 is provided with multiple chip-breaking structures. These comprise, for one, multiple depressions 36 which are designed in the form of pockets and are arranged along the cutting edge. The chip-breaking structures further comprise multiple projections 38 in the form of ribs which are provided on the chipping surface 32.

The depressions 36 and the projections 38 are arranged in an alternating manner, with five depressions 36 and four ribs 38 being arranged here. The center depressions 36 are arranged in this case on a longitudinal or center axis of the cutting insert determined by the extension direction of the shank 12.

Figure 12:
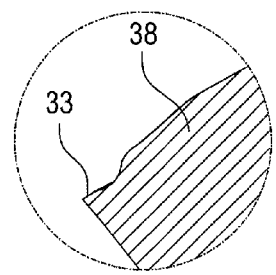
FIG. 12 shows the detail XII from FIG. 11 in enlarged view.

Each of the depressions 36 originates, when viewed from the cutting edge 30, immediately behind the chamfer 33 and initially drops inwardly at a slight incline, before then returning to the level of the chipping surface 32 at a clearly steeper incline (see in particular FIG. 12). When viewed in the circumferential direction, each depression 36 is demarcated by lateral edges 40, which run roughly in the radial direction, i.e. toward the center of the chipping surface 32.

Measured in the radial direction, the width of the depression 36 is roughly ten times the width of the chamfer 33.

The projections 38, which are designed here as ribs, originate at a short distance behind the chamfer 33 and extend in the direction of the shank 12. Each projection has a radially outer-lying segment 38A, which extends nearly radially, and, connected thereto, a radially inner-lying segment 38B, which is bent away in relation to the radially outer segment 38A. The radially inward lying segments 38B of the projections 38 each run to a point which lies closer to the shank 12 than the point to which the segments 38A of the projections 38 extend.

Figure 5:
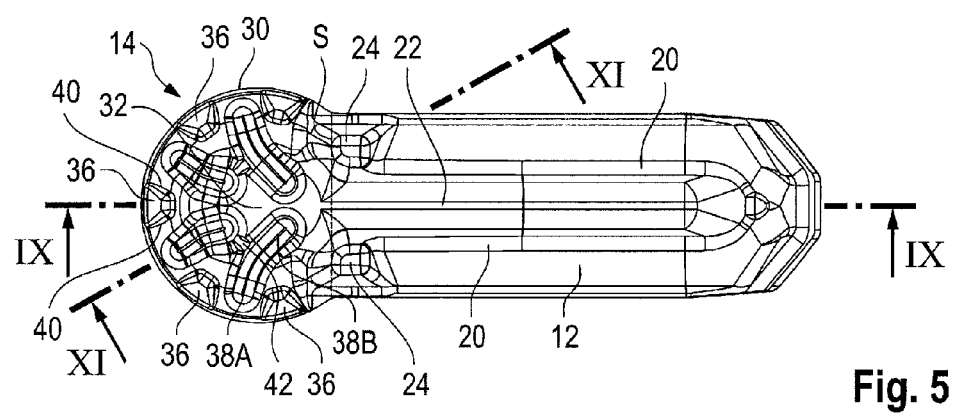
FIG. 5 shows a top view of the cutting insert from FIG. 4.
Figure 8:
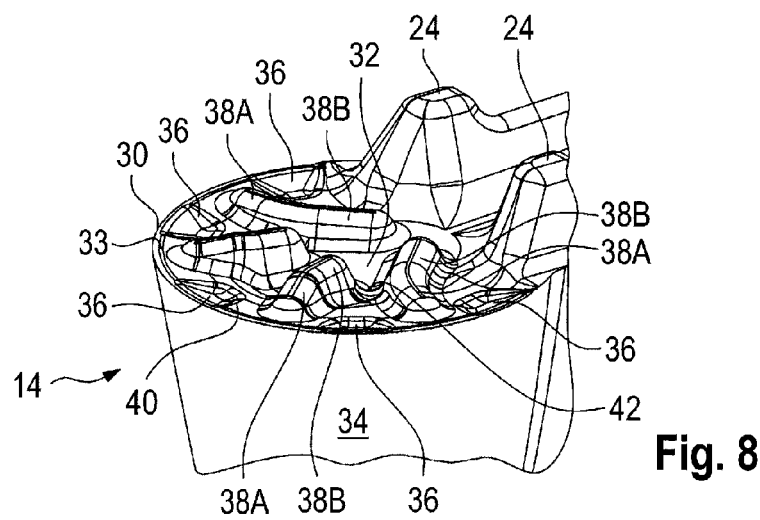
FIG. 8 shows an enlarged, perspective view of the segment of the cutting insert from FIG. 4 provided with the cutting edge.

As is clear particularly from FIGS. 5 and 8, the two rear, outer projections 38 are designed as longer than the two front projections lying closer to the center plane of the cutting insert.

Provided between the two projections on both sides of the center plane is additionally a ridge 42, the height of which is in the neighborhood of 20% that of the projections.

Figure 9:
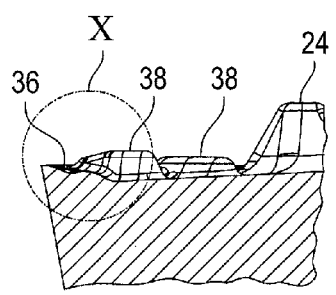
FIG. 9 shows a section along plane IX-IX from FIG. 5.
Figure 10:
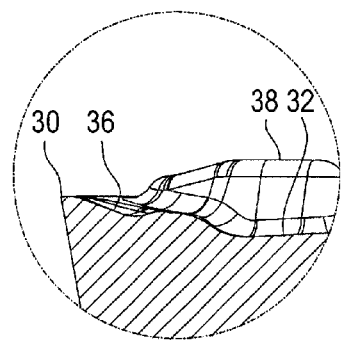
FIG. 10 shows the detail X from FIG. 9 in enlarged view.
Figure 11:
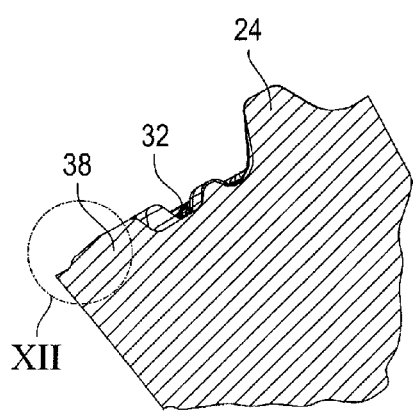
FIG. 11 shows a section along the plane XI-XI from FIG. 5.

As is clear particularly from FIG. 9, the chipping surface 32 is designed as level in its center area, whereas it rises toward the cutting edge 30. Because the cutting edge 30 lies on a higher level than the chipping surface 32, the downward slope of the projections 38 to the cutting surface 32 is clearly more pronounced on the radially inner-lying side than on the radially outer-lying side (see in particular FIG. 11).

The interaction between the depressions 36, which are located below the level of the chipping surface in the outer lying areas of the cutting head 14, and the projections 38, which are located above the chipping surface in this area and also in the center segment of the cutting head, results in a good chip-breaking effect. The chip-breaking effect is uniformly good at different angles of attack and cutting depths.

The invention claimed is:

1. Interchangeable cutting insert comprising:
 a shank, which transitions into a cutting head, the cutting head having a chipping surface, which, when viewed from above, is a segment of a circle with a height greater than a radius of the chipping surface, wherein the shank defines a center plane which extends vertically and parallel to the shank, generally bifurcating the cutting insert;
 wherein a chord of the segment of the circle constitutes the transition to the shank, wherein a cutting edge is formed on an outer edge of the chipping surface and multiple chipbreaking structures are provided on the chipping surface;
 wherein the chip-breaking structures have depressions in the chipping surface and projections arranged between the depressions;
 wherein the projections protrude beyond the chipping surface;
 the projections being defined as ribs; wherein there are at least four ribs, the at least four ribs comprising two shorter ribs lying closest to the center plane and two longer ribs spaced further from the center plane than the two shorter ribs.

2. The cutting insert according to claim 1, wherein the chipping surface has a chamfer that transitions into the chipping surface.

3. The cutting insert according to claim 2, wherein the depressions terminate radially outside at the transition between chamfer and chipping surface.

4. The cutting insert according to claim 1, wherein the depressions have lateral edges oriented radially.

5. The cutting insert according to claim 1, wherein the depressions gently taper off radially outward to the cutting edge.

6. The cutting insert according to claim 1, wherein at least three depressions are provided.

7. The cutting insert according to claim 1, wherein the ribs extend generally radially.

8. The cutting insert according to claim 7, wherein the ribs have a radially outer segment oriented radially and a radially inner segment which is bent toward the shank in relation to a radial orientation.

9. The cutting insert according to claim 1, wherein provided between the two center ribs is a level at which the chipping surface drops.

10. The cutting insert according to claim 7, wherein a ridge is provided between one of the shorter ribs and an adjacent one of the longer ribs, a height of the ridge ranging between 10 to 30% of a height of the ribs.

11. The cutting insert according to claim 1, wherein the cutting edge has a chamfer which transitions into the chipping surface, and that the projections terminate at a distance from the chamfer.

12. The cutting insert according to claim 11, wherein the distance ranges between 10 and 50% of a radial extension of the depressions.

13. The cutting insert according to preceding claim 1, wherein a width of the depressions on a radially outer lying side thereof is approximately 20% of the radius of the chipping surface.

14. The cutting insert according to claim 1, wherein a width of the projections is approximately 20% of the radius of the chipping surface.

15. The cutting insert according to claim 6, wherein at least five depressions are provided.

* * * * *